(12) United States Patent
Chou et al.

(10) Patent No.: US 10,625,216 B2
(45) Date of Patent: Apr. 21, 2020

(54) POLYIMIDE MIXTURE AND GAS SEPARATION MEMBRANE

(71) Applicant: Taiwan Textile Research Institute, New Taipei (TW)

(72) Inventors: Shang-Chih Chou, New Taipei (TW); Chun-Hung Chen, New Taipei (TW); Chien-Chieh Hu, New Taipei (TW)

(73) Assignee: Taiwan Textile Research Institute, New Taipei (TW)

( * ) Notice: Subject to any disclaimer, the term of this patent is extended or adjusted under 35 U.S.C. 154(b) by 160 days.

(21) Appl. No.: 15/629,749

(22) Filed: Jun. 22, 2017

(65) Prior Publication Data

US 2018/0028984 A1 Feb. 1, 2018

(30) Foreign Application Priority Data

Jul. 26, 2016 (TW) .............................. 105123560 A

(51) Int. Cl.
*B01D 71/64* (2006.01)
*B01D 69/14* (2006.01)
(Continued)

(52) U.S. Cl.
CPC ........... *B01D 71/64* (2013.01); *B01D 53/228* (2013.01); *B01D 67/0079* (2013.01);
(Continued)

(58) Field of Classification Search
CPC .............. B01D 53/228; B01D 67/0079; B01D 69/148; B01D 71/027; B01D 71/64;
(Continued)

(56) References Cited

U.S. PATENT DOCUMENTS 5,969,087 A * 10/1999 Maeda .................... B01D 71/64
428/473.5
2007/0022877 A1* 2/2007 Maraud ................ B01D 53/228
95/51
(Continued)

FOREIGN PATENT DOCUMENTS

CN 103172898 6/2013
CN 104853919 8/2015
JP 2006021455 1/2006

OTHER PUBLICATIONS

Yuri YamPolskii et al., "Membrane Gas Separation," Wiley, Aug. 2010, pp. 1-392.

(Continued)

*Primary Examiner* — Jason M Greene
(74) *Attorney, Agent, or Firm* — JCIPRNET

(57) ABSTRACT

A polyimide mixture including a polyimide and an amino-containing silica particle is provided. The polyimide includes a repeating unit represented by formula 1:

formula 1

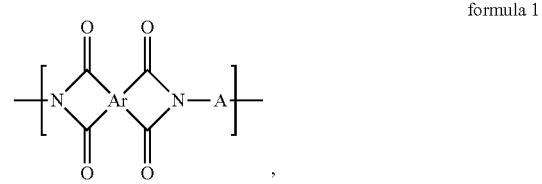

wherein Ar includes

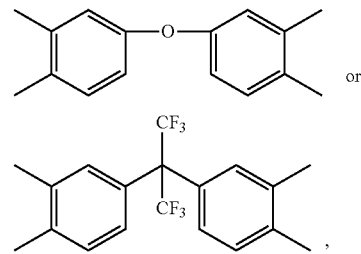

and A includes

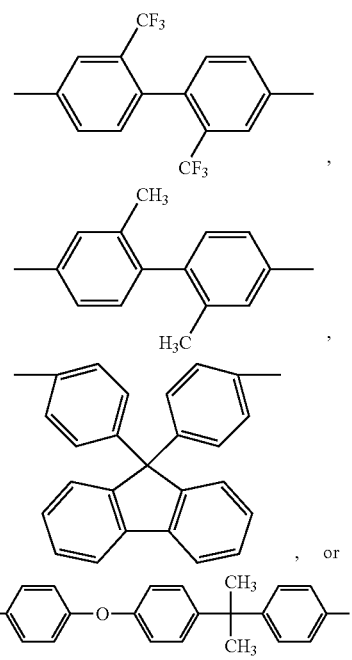

(Continued)

-continued

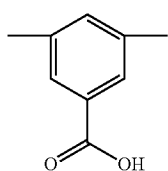

The amino-containing silica particle is mixed with the polyimide, and is obtained by the hydrolysis condensation reaction of an alkoxysilane shown in formula 2 and an alkoxysilane shown in formula 3 in the presence of a catalyst:

$$Si(OR^1)_4 \qquad \text{formula 2,}$$

$$(NH_2{-}Y)_m{-}Si(OR^2)_{4-m} \qquad \text{formula 3,}$$

wherein in formula 2, $R^1$ is a $C_1$-$C_{10}$ alkyl group; and in formula 3, Y is a $C_1$-$C_{10}$ alkyl group or a $C_2$-$C_{10}$ alkenyl group, $R^2$ is a $C_1$-$C_{10}$ alkyl group, and m is an integer of 1 to 3.

8 Claims, No Drawings

(51) Int. Cl.
| | | |
|---|---|---|
| | *B01D 67/00* | (2006.01) |
| | *B01D 53/22* | (2006.01) |
| | *C08G 73/10* | (2006.01) |
| | *C08K 3/36* | (2006.01) |
| | *C08K 9/06* | (2006.01) |
| | *B01D 71/02* | (2006.01) |

(52) U.S. Cl.
CPC ....... *B01D 69/148* (2013.01); *C08G 73/1007* (2013.01); *C08G 73/1039* (2013.01); *C08G 73/1053* (2013.01); *C08G 73/1071* (2013.01); *C08G 73/1078* (2013.01); *C08G 73/1082* (2013.01); *C08K 3/36* (2013.01); *C08K 9/06* (2013.01); *B01D 71/027* (2013.01)

(58) Field of Classification Search
CPC .......... B01D 2257/504; C08G 73/1039; C08G 73/1053; C08G 73/1071; C08G 73/1078; C08G 73/1082; C08K 3/36; C08K 9/06
See application file for complete search history.

(56) References Cited

U.S. PATENT DOCUMENTS

| | | | |
|---|---|---|---|
| 2010/0305289 A1* | 12/2010 | Jiang | B01D 67/0079 526/265 |
| 2011/0107911 A1* | 5/2011 | Hoang | B01D 53/228 95/45 |
| 2011/0247360 A1* | 10/2011 | Hasse | B01D 71/64 62/606 |
| 2013/0177934 A1* | 7/2013 | Wiesner | C01B 33/18 435/29 |
| 2016/0072110 A1* | 3/2016 | Sugawara | B01D 69/12 429/144 |

OTHER PUBLICATIONS

"Office Action of Taiwan Counterpart Application," dated Aug. 10, 2017, p. 1-p. 10, in which the listed references were cited.
Chih-Ming Chiu, "Synthesis and Characterization of Soluble Polyimide/Silica Nanocomposites", Department of Chemical Engineering, National Cheng Kung University, May 2009, pp. 1-68.
"Office Action of Taiwan Counterpart Application", dated Feb. 22, 2018, p. 1-p. 5.
"Office Action of China Counterpart Application," dated Jun. 27, 2019, p. 1-p. 8.

* cited by examiner

POLYIMIDE MIXTURE AND GAS SEPARATION MEMBRANE

CROSS-REFERENCE TO RELATED APPLICATION

This application claims the priority benefit of Taiwan application serial no. 105123560, filed on Jul. 26, 2016. The entirety of the above-mentioned patent application is hereby incorporated by reference herein and made a part of this specification.

BACKGROUND OF THE INVENTION

Field of the Invention

The invention is related to a mixture, and more particularly, to a polyimide mixture and a gas separation membrane made from the polyimide mixture.

Description of Related Art

The gas separation membrane selects gases mainly based on the difference of diffusion rates of those gases in the gas separation membrane. Therefore, the gas separation membrane can select and purify specific gas from a mixed gas, and has a wide range of application prospects in fields such as gas purification, medical insurance, or fuel systems. A known material for the gas separation membrane is a polymer such as cellulose acetate or polysulfone. Although many gas separation membranes have currently been developed, the uses of gas separation membranes are still in a limited range. Therefore, attempts at the development of a novel gas separation membrane are still underway.

SUMMARY OF THE INVENTION

The invention provides a polyimide mixture that can be used to form a dense membrane, and the membrane can be used as a gas separation membrane.

The polyimide mixture of the invention includes a polyimide and an amino-containing silica particle. The polyimide includes a repeating unit represented by formula 1:

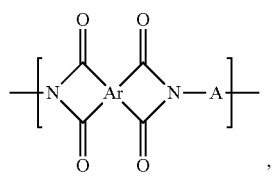

formula 1 wherein Ar includes

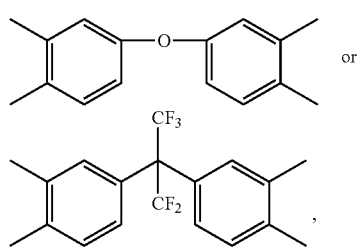

and A includes

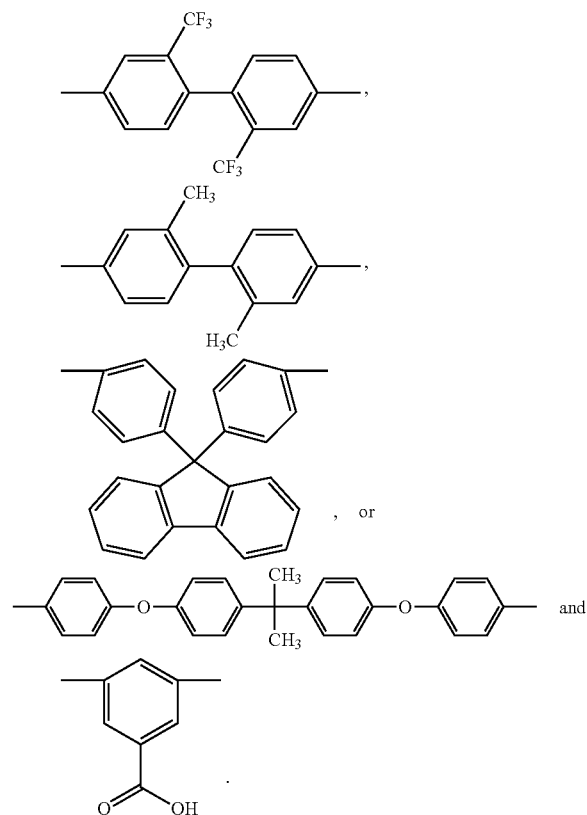

The amino-containing silica particle is mixed with the polyimide, and is obtained by the hydrolysis condensation reaction of an alkoxysilane shown in formula 2 and an alkoxysilane shown in formula 3 in the presence of a catalyst:

$$Si(OR^1)_4 \qquad \text{formula 2,}$$

$$(NH_2-Y)_m-Si(OR^2)_{4-m} \qquad \text{formula 3,}$$

wherein in formula 2, $R^1$ is a $C_1$-$C_{10}$ alkyl group; and in formula 3, Y is a $C_1$-$C_{10}$ alkyl group or a $C_2$-$C_{10}$ alkenyl group, $R^2$ is a $C_1$-$C_{10}$ alkyl group, and m is an integer of 1 to 3.

In an embodiment of the invention, based on the total weight of the polyimide, the content of the amino-containing silica particle is 3 wt % to 30 wt %.

In an embodiment of the invention, based on the total weight of the polyimide, the content of the amino-containing silica particle is 3 wt % to 20 wt %.

In an embodiment of the invention, the equivalent number of the amino in the amino-containing silica particle is 5 mmole/g to 10 mmole/g.

In an embodiment of the invention, the alkoxysilane shown in formula 2 includes tetramethoxysilane, tetraethoxysilane, tetrapropoxysilane, or tetrabutoxysilane, and the alkoxysilane shown in formula 3 includes 3-aminopropyltrimethoxysilane, 3-aminopropyltriethoxysilane, 3-aminoethylaminopropyltrimethoxysilane, or 3-aminoethylaminopropyltriethoxysilane.

In an embodiment of the invention, the alkoxysilane shown in formula 2 includes tetraethoxysilane, and the alkoxysilane shown in formula 3 includes 3-aminopropyltriethoxysilane.

In an embodiment of the invention, the polyimide is represented by formula 1-1, formula 1-2, formula 1-3, or formula 1-4 below:

formula 1-1

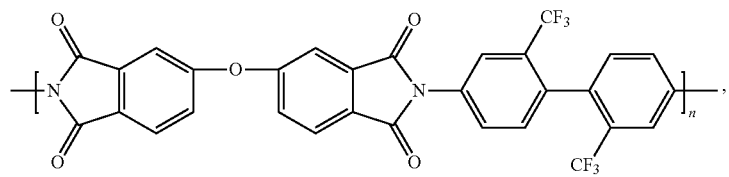

formula 1-2

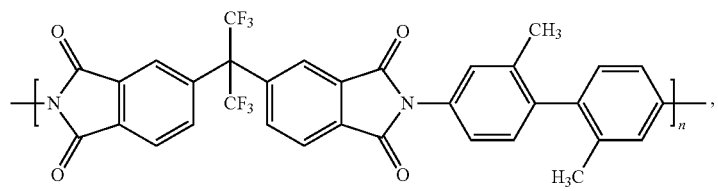

formula 1-3

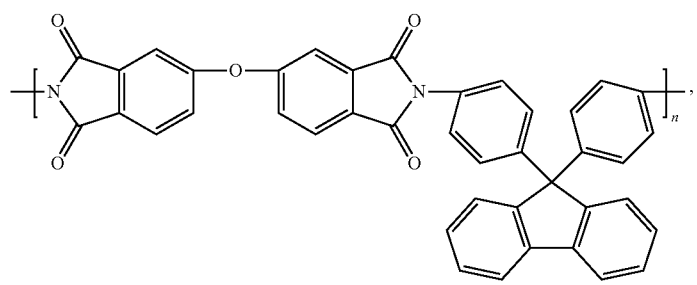

formula 1-4

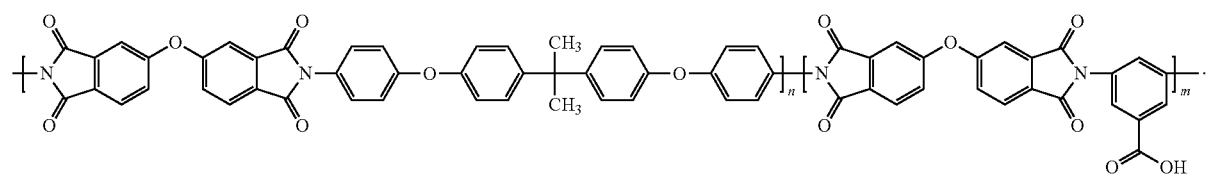

In an embodiment of the invention, the intrinsic viscosity of the polyimide is 0.5 dL/g to 1.5 dL/g.

The gas separation membrane of the invention is made from the polyimide mixture.

Based on the above, the polyimide mixture of the invention includes the polyimide with the repeating unit represented by formula 1 and the amino-containing silica particle mixed with the polyimide, wherein the amino-containing silica particle is obtained by the hydrolysis condensation reaction of the alkoxysilane shown in formula 2 and the alkoxysilane shown in formula 3 in the presence of a catalyst. Therefore, the polyimide mixture of the invention can facilitate membrane processing and form a dense matrix that can be applied to gas separation membrane.

In order to make the aforementioned features and advantages of the disclosure more comprehensible, embodiments accompanied with figures are described in detail below.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification.

In the present specification, skeleton formulas are sometimes used to represent the structures of polymers or groups. Such representation can omit carbon atoms, hydrogen atoms, and carbon-hydrogen bonds. Of course, structural formulas with clear illustrations of atoms or atomic groups are definitive.

An embodiment of the invention provides a polyimide mixture including a polyimide and an amino-containing silica particle. In the present embodiment, the polyimide includes a repeating unit represented by formula 1:

formula 1

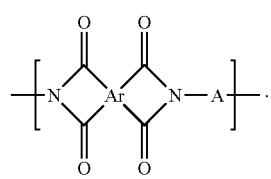

In formula 1, Ar includes

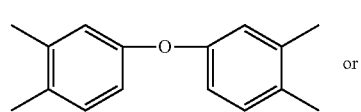 or

-continued

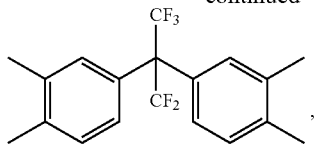

and A includes

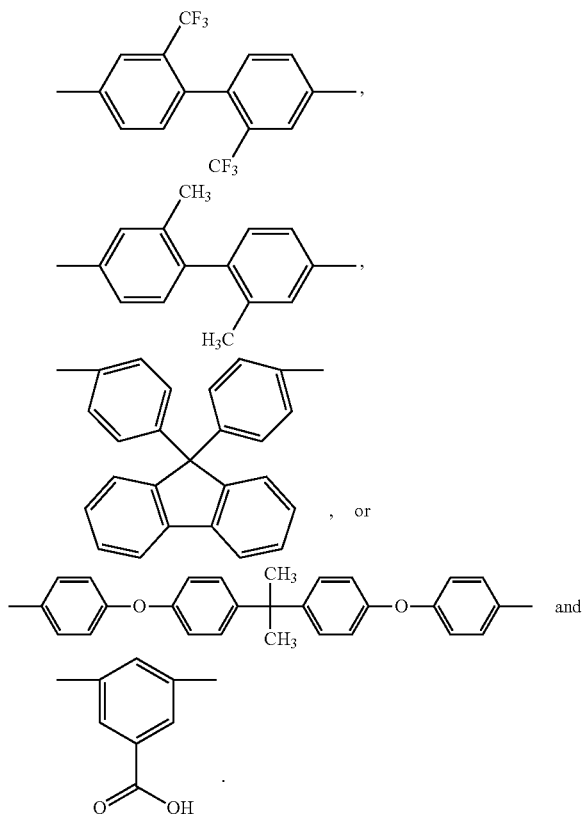

Specifically, Ar is a residue in a tetracarboxylic dianhydride compound other than 2 carboxylic anhydride groups (—(CO)₂O); and A is a residue in a diamine compound other than 2 amino groups (—NH₂). In other words, in the present embodiment, the polyimide can be obtained by polycondensation of a tetracarboxylic dianhydride compound and a diamine compound or obtained by polycondensation of a tetracarboxylic dianhydride compound and two diamine compounds. Moreover, in the present specification, for the forming of the polyimide, the tetracarboxylic dianhydride compound is referred to as a dianhydride monomer and the diamine compound is referred to as a diamine monomer. In other words, in the present embodiment, one dianhydride monomer and one diamine monomer can be used to prepare the repeating unit shown in formula 1, or one dianhydride monomer and two diamine monomers can be used to prepare the repeating unit shown in formula 1.

Specifically, in the present embodiment, the dianhydride monomer used to form the polyimide includes oxydiphthalic dianhydride (ODPA) or 4,4'-(hexafluoro-isopropylidene)diphthalic dianhydride (6FDA), and the diamine monomer includes 2,2-bis(trifluoromethyl)diaminobiphenyl (TFMB), 2,2-dimethyl diaminobiphenyl (DMB), 9,9-bis(4-aminophenyl)fluorene (FDA), or 2,2-bis(4-aminophenoxyphenyl)propane (BAPP) and 3,5-diaminobenzoic acid (DABA).

In an embodiment, the polyimide is represented by formula 1-1 below:

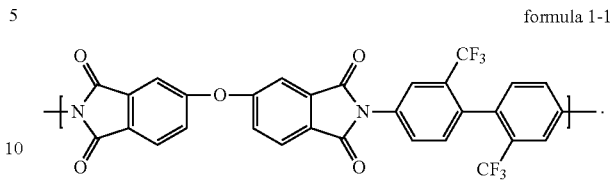

formula 1-1

In other words, at this point, the polyimide is prepared by using ODPA as the dianhydride monomer and using TFMB as the diamine monomer.

Specifically, the polyimide represented by formula 1-1 can be prepared by the following steps. First, in a water bath (room temperature), TFMB was added in a solvent to form a diamine monomer solution after complete dissolution. In the present step, the solvent is, for instance, a high-polarity solvent such as N,N-dimethylacetamide (DMAc), N-methyl-2-pyrrolidone (NMP), 1,3-dimethyl imidazolinone (DMI), or m-cresol.

Next, in a water bath (room temperature), ODPA was added in the diamine monomer solution as an reactant to form a poly(amic acid) solution. In the present step, the mole ratio of the diamine monomer (i.e., TFMB) and the dianhydride monomer (i.e., ODPA) is, for instance, 0.98:1 to 1:1.02; the reaction time is, for instance, 4 hours to 8 hours; and the solid content of the poly(amic acid) solution is, for instance, 8 wt % to 20 wt %.

Then, in a nitrogen atmosphere, an imidization reaction (i.e., dehydration-cyclization) is performed on the poly(amic acid) solution to form the polyimide represented by formula 1-1. Specifically, the imidization reaction can be performed by, for instance, in a situation without using a catalyst, first baking the polyamide acid solution at 100° C. to 120° C. for 10 minutes to 30 minutes to remove the solvent, and then increasing the temperature to 300° C. to 350° C. for 30 minutes to 60 minutes to facilitate the reaction. However, the invention is not limited thereto. In other embodiments, the imidization reaction can also be performed in the presence of a catalyst.

In another embodiment, the polyimide is represented by formula 1-2 below:

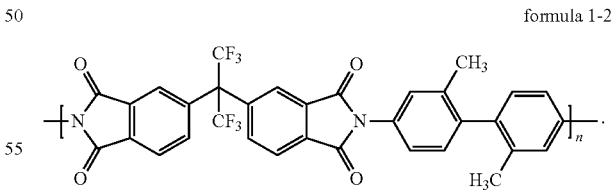

formula 1-2

In other words, at this point, the polyimide is prepared by using 6FDA as the dianhydride monomer and using DMB as the diamine monomer. Moreover, the polyimide represented by formula 1-2 can be prepared by the same steps for preparing the polyimide represented by formula 1-1, and the difference is only that a different dianhydride monomer and a different diamine monomer were used.

In yet another embodiment, the polyimide is represented by formula 1-3 below:

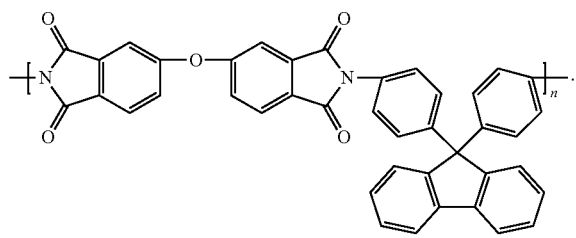

formula 1-3

In other words, at this point, the polyimide is prepared by using ODPA as the dianhydride monomer and using FDA as the diamine monomer. Moreover, similarly, the polyimide represented by formula 1-3 can be prepared by the same steps for preparing the polyimide represented by formula 1-1, and the difference is only that a different diamine monomer was used.

In still yet another embodiment, the polyimide is represented by formula 1-4 below:

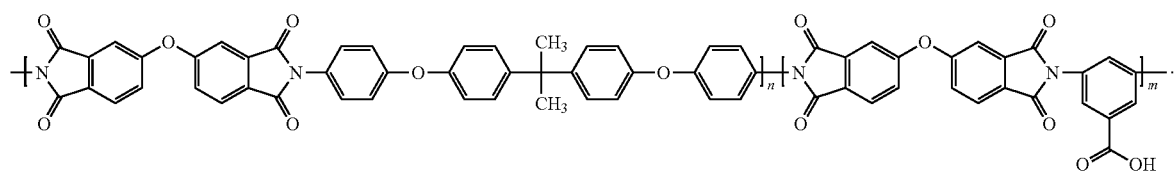

formula 1-4

In other words, at this point, the polyimide is a copolymer, and is prepared by using ODPA as the dianhydride monomer and using BAPP and DABA as the diamine monomers. Moreover, similarly, the polyimide represented by formula 1-4 can be prepared using the same steps for preparing the polyimide represented by formula 1-1, and the difference is mainly that a different diamine monomer was used, and the polyimide represented by formula 1-4 was prepared using two diamine monomers, otherwise the polyimide represented by formula 1-1 was prepared using only one diamine monomer.

Moreover, in the present embodiment, the intrinsic viscosity of the polyimide is 0.5 dL/g to 1.5 dL/g, preferably 1.0 dL/g to 1.5 dL/g. If the intrinsic viscosity of the polyimide is less than 0.5 dL/g, then membrane-forming is poor; and if the intrinsic viscosity of the polyimide is higher than 1.5 dL/g, then processing is difficult.

In the present embodiment, the amino-containing silica particle is mixed with the polyimide. Specifically, the method of mixing the amino-containing silica particle in the polyimide includes, for instance, the following steps. First, at room temperature, after the amino-containing silica particle is placed in a solvent, ultrasonic oscillation is performed for 0.5 hours to 2 hours to make the particle size distribution thereof more even and to evenly spread the amino-containing silica particle in the solvent. In the present step, the solvent is, for instance, N-methyl-2-pyrrolidone (NMP) or tetrahydrofuran (THF). Next, the polyimide is dissolved in a mixed solution in which the amino-containing silica particle is dispersed, and then stirring is performed. In the present step, the stirring time is, for instance, 1 hour to 24 hours; and the solid content of the polyimide is, for instance, 10 wt % to 15 wt %. From another perspective, in the present embodiment, the polyimide mixture further includes a solvent.

Moreover, in the present embodiment, the amino-containing silica particle is obtained by the hydrolysis condensation reaction of an alkoxysilane shown in formula 2 and an alkoxysilane shown in formula 3 in the presence of a catalyst:

$$Si(OR^1)_4 \quad \text{formula 2,}$$

$$(NH_2-Y)_m-Si(OR^2)_{4-m} \quad \text{formula 3.}$$

In formula 2, $R^1$ is a $C_1$-$C_{10}$ alkyl group. Specifically, examples of the alkoxysilane shown in formula 2 include, for instance, but are not limited to: tetramethoxysilane, tetraethoxysilane, tetrapropoxysilane, or tetrabutoxysilane. Examples of the alkoxysilane shown in formula 2 preferably include tetraethoxysilane.

In formula 3, Y is a $C_1$-$C_{10}$ alkyl group or a $C_2$-$C_{10}$ alkenyl group; $R^2$ is a $C_1$-$C_{10}$ alkyl group; and m is an integer of 1 to 3. Specifically, examples of the alkoxysilane shown in formula 3 include, for instance, but are not limited to: 3-aminopropyltrimethoxysilane, 3-aminopropyltriethoxysilane, 3-aminoethylaminopropyltrimethoxysilane, or 3-aminoethylaminopropyltriethoxysilane. Examples of the alkoxysilane shown in formula 3 preferably include 3-aminopropyltriethoxysilane.

The catalyst is, for instance, an acid catalyst or an alkali catalyst. Specifically, the acid catalyst includes, but is not limited to: inorganic acid such as hydrochloric acid, nitric acid, sulfuric acid, sulfurous acid, phosphoric acid, chloric acid, chlorous acid, or hypochlorous acid; or organic carboxylic acid such as acetic acid, formic acid, propionic acid, oxalic acid, malonic acid, succinic acid, citric acid, malic acid, adipic acid, or azelaic acid. The alkali catalyst includes, but is not limited to: alkali metal hydroxide such as lithium hydroxide, sodium hydroxide, or potassium hydroxide; an ammonium compound such as ammonium hydroxide, ammonium chloride, or ammonium bromide; alkaline sodium phosphate such as sodium metaphosphate, sodium pyrophosphate, or sodium polyphosphate; aliphatic amine such as allylamine, diallylamine, triallylamine, isopropylamine, diisopropylamine, ethylamine, diethylamine, triethylamine, 2-ethylhexylamine, 3-ethoxypropylamine, diisobutylamine, 3-(diethylamino)propylamine, di-2-ethylhexylamine, 3-(dibutylamino)propylamine, tetramethylethylenediamine, tert-butylamine, sec-butylamine, propylamine, 3-(methylamino)propylamine, 3-(dimethylamino)propylamine, 3-methoxyamine, dimethylethanolamine, methyldiethanolamine, diethanolamine, or triethanolamine; or a nitrogen-containing heterocyclic compound such as morpholine, N-methylmorpholine, 2-methylmorpholine, piperazine and a derivative thereof, piperidine and a derivative thereof, or imidazole and a derivative thereof. Moreover, the usage amount of the catalyst is, for instance, decided by the pH value of the hydrolysis condensation reaction, wherein the acid catalyst is, for instance, suitable for adjusting the reaction condition to pH=2 to 4, and the alkali catalyst is, for instance, suitable for adjusting the reaction condition to pH=10 to 12.

Moreover, the hydrolysis condensation reaction is performed in a solvent, and can be performed using any method known to those having ordinary skill in the art. Specifically, the method of performing the hydrolysis condensation reaction includes the following steps: first, at 25° C. to 35° C., the alkoxysilane shown in formula 2 and the alkoxysilane shown in formula 3 are dissolved in a solvent. Next, at 25° C. to 35° C., a catalyst is added while stirring, and a reaction is performed as stirring for 3 hours to 5 hours. In the step, the solvent is not particularly limited as long as the solvent can dissolve the alkoxysilane shown in formula 2, the alkoxysilane shown in formula 3, and the catalyst. Specifically, in the present embodiment, the solvent includes, but is not limited to: water; an alcohol solvent such as methanol, ethanol, n-propanol, 2-propanol, n-butanol, 2-butanol, or tert-butanol; a dimethylacetamide solvent; or an N-methylpyrrolidone solvent. Moreover, the solvent can be used alone or in combination.

Moreover, after the hydrolysis condensation reaction is completed, a drying treatment can be further performed to remove the solvent. The method of the drying treatment includes, for instance, heating using a heating plate or a hot air circulation oven, wherein the temperature condition is, for instance, 60° C. to 80° C., and the time condition is, for instance, 3 hours to 5 hours.

Moreover, if needed, a pH adjuster can be added to adjust the pH of the solution to facilitate the hydrolysis condensation reaction. The pH adjuster includes, for instance, a buffer such as boric acid or phosphoric acid, an acid such as hydrochloric acid or sulfuric acid, or a base such as sodium hydroxide or potassium hydroxide.

Moreover, in the present embodiment, the equivalent number of the amino in the amino-containing silica particle is 5 mmole/g to 10 mmole/g, preferably 6 mmole/g to 8 mmole/g.

It should be mentioned that, in the present embodiment, via containing the polyimide including the repeating unit represented by formula 1, and the amino-containing silica particle mixed with the polyimide and obtained by the hydrolysis condensation reaction of the alkoxysilane shown in formula 2 and the alkoxysilane shown in formula 3 in the presence of a catalyst, the polyimide mixture can facilitate membrane forming processing, and the membrane made from the polyimide mixture is a dense membrane.

Since the membrane obtained from the polyimide mixture is dense, the membrane can be used as a gas separation membrane. In the present embodiment, the membrane obtained from the polyimide mixture can be used to separate oxygen from nitrogen, or carbon dioxide from nitrogen. In other words, in the present embodiment, the polyimide mixture can be applied in, for instance, the oxygen enrichment field, fuel system field, medical insurance field, carbon supplement field, or on board inert gas generation system (OBIGGS) field.

Specifically, by containing the amino-containing silica particle mixed with the polyimide and obtained by the hydrolysis condensation reaction of the alkoxysilane shown in formula 2 and the alkoxysilane shown in formula 3 in the presence of a catalyst, the membrane made from the polyimide mixture has good interface type and therefore has a dense structure.

In an embodiment, based on the total weight of the polyimide, when the content of the amino-containing silica particle is 3 wt % to 30 wt %, the membrane made from the polyimide mixture can be used as a gas separation membrane separating oxygen from nitrogen, good gas permeation can be achieved using the amino-containing silica particle, and good oxygen/nitrogen separation selectivity can be maintained at the amount of the amino-containing silica particle. This is because for oxygen and nitrogen, when the content of the amino-containing silica particle is within the above ranges, the gas separation selectivity of the polyimide itself is excellent, and the polyimide has good interface compatibility with the amino-containing silica particle.

In another embodiment, based on the total weight of the polyimide, when the content of the amino-containing silica particle is 3 wt % to 20 wt %, the membrane made from the polyimide mixture can be used as a gas separation membrane separating carbon dioxide from nitrogen, good gas permeation can be achieved using the amino-containing silica particle, and good carbon dioxide/nitrogen separation selectivity can be maintained at the amount of the amino-containing silica particle. This is because for carbon dioxide and nitrogen, when the content of the amino-containing silica particle is within the above ranges, the gas separation selectivity of the polyimide itself is excellent, and the polyimide has good interface compatibility with the amino-containing silica particle.

In other words, in the present embodiment, in order to obtain a gas separation membrane having both good gas permeation and gas separation selectivity, the content range of the amino-containing silica particle in the polyimide mixture would be different, based on the types of gases separated.

It should be mentioned that, in the present embodiment, via containing the polyimide including the repeating unit represented by formula 1 and the amino-containing silica particle mixed with the polyimide and obtained by the hydrolysis condensation reaction of the alkoxysilane shown in formula 2 and the alkoxysilane shown in formula 3 in the presence of a catalyst, the polyimide mixture not only has good formability and the capacity to form a dense membrane, the resulting membrane also has good temperature resistance and material stability, such that the membrane can be applied in a high-security field. For instance, the membrane made from the polyimide mixture is suitable for carbon capture of the exhaust gas from a burning boiler. Moreover, when the membrane made from the polyimide mixture is applied in the carbon capture of the exhaust gas from a burning boiler, excellent carbon dioxide permeation and separation selectivity can be achieved. This is because in an environment with water vapor, a reaction occurs to the carbon dioxide and the amino on the amino-containing silica particle in the membrane to promote carbon dioxide transmission, such that permeation of carbon dioxide is accelerated.

As described above, the dense membrane made from the polyimide mixture can be used as a gas separation membrane, and in the following, the gas separation membrane is described.

Another embodiment of the invention provides a gas separation membrane, which is made from the polyimide mixture in any embodiment above. Specifically, the preparation method of the gas separation membrane includes the following steps. First, at room temperature, a polyimide mixture is coated on a substrate to form a solution membrane. In the present step, the method of coating can include a general coating method such as scrape coating, wire bar coating, dip coating, spin coating, spray coating, brush coating, roll transfer, screen printing, inkjet, or flexographic printing; and the substrate is, for instance, a glass substrate, woven fabric substrate, or a tubular woven fabric substrate. Moreover, the polyimide mixture and relevant descriptions of the components thereof are provided in detail in the above embodiments and are therefore not repeated herein.

Next, the solution membrane is cured by volatilizing the solvent. In the present step, the method of volatilizing the solvent includes, for instance: natural volatilization or heating. Moreover, if the solution membrane is coated on a glass substrate, then the membrane naturally falls off after being cured by volatilizing the solvent; and if the solution membrane is coated on a nonwoven fabric substrate, then the membrane is attached to the nonwoven fabric substrate after being cured by volatilizing the solvent.

Next, a drying treatment is performed on the membrane to remove residual solvent to form a gas separation membrane. In the present step, the method of the drying treatment includes, for instance, heating using a vacuum oven or natural volatilization, wherein when heating is performed using a vacuum oven, the temperature condition is, for instance, 50° C. to 120° C., and the time condition of the drying treatment is, for instance, 0.5 hours to 4 hours.

Moreover, in the present embodiment, since the gas separation membrane is made by using the polyimide mixture, the gas separation membrane is a composite gas separation membrane.

Moreover, in the present embodiment, the thickness of the gas separation membrane is between 100 microns and 200 microns. If the solution membrane is coated on a non-woven fabric substrate during the preparation, then the thickness of the gas separation membrane is between 1 micron and 10 microns. Basically, a smaller thickness indicates a greater gas permeation.

The features of the invention are more specifically described in the following with reference to Examples 1 to 9 and Comparative Examples 1 to 5. Although the following Examples 1 to 9 are described, the materials used and the amounts and ratios thereof, as well as handling details and handling processes . . . etc. can be suitably modified without exceeding the scope of the invention. Accordingly, restrictive interpretation should not be made to the invention based on the examples described below.

Example 1

Preparation of Polyimide

In a water bath (room temperature), 2,2-bis(trifluoromethyl)diamino biphenyl was added in a N-methyl-2-pyrrolidone (NMP) solvent, and a diamine monomer solution was formed after complete dissolution. Next, oxydiphthalic dianhydride was added in the diamine monomer solution to react for 4 hours to form a poly(amic acid) solution. In the present step, the mole ratio of 2,2-bis(trifluoromethyl)diamino biphenyl and diphenyl ether tetracarboxylic dianhydride is 1:1, and the solid content of the poly(amic acid) solution is 12 wt %. Next, chemical catalysts pyridine and acetic anhydride were added, and the temperature was increased to 120° C. to perform imidization, and the mixture was reacted for 3 hours to obtain the polyimide of Example 1, wherein the polyimide is represented by formula 1-1 above, and the intrinsic viscosity of the polyimide is 1.0 dL/g.

Preparation of Amino-Containing Silica Particle

At room temperature, 4.17 g of tetraethoxysilane (made by Acros) and 1.11 g of 3-aminopropyltriethoxysilane (made by Acros) were dissolved in 10 g of DMAc used as a solvent. Next, 0.5 g of NaOH used as a catalyst was added within 30 minutes while stirring at room temperature. Next, at 30° C., stirring was continuously performed for a hydrolysis condensation reaction for 4 hours. Next, the solvent was removed using a centrifugal method to obtain the amino-containing silica particle of Example 1, wherein the equivalent number of the amino in the amino-containing silica particle is 8.5 mmole/g.

Preparation of Polyimide Mixture

At room temperature, after 0.36 g of the amino-containing silica particle of Example 1 was placed in 88 ml of a THF solvent, ultrasonic oscillation was performed for 2 hours to make the particle size distribution thereof more even and to evenly spread the amino-containing silica particle in the THF solvent. Next, 12 g of the polyimide of Example 1 was dissolved in a mixed solution in which the amino-containing silica particle of Example 1 was dispersed at 12 wt % solid content, and stirring was performed for 24 hours to obtain the polyimide mixture of Example 1.

Preparation of Gas Separation Membrane

First, the polyimide mixture of Example 1 was coated on a glass substrate using a 500-micron coating scraper. Next, after the solution membrane on the glass substrate was cured by volatilizing the solvent, the solution membrane was peeled off from the glass substrate. Next, the membrane peeled off from the glass substrate was placed in a vacuum oven at 100° C. to dry for 48 hours to remove residual solvent and obtain the gas separation membrane of Example 1, wherein the thickness of the gas separation membrane is about 35 microns.

Example 2

Preparation of Polyimide and Amino-Containing Silica Particle

The polyimide and amino-containing silica particle of Example 2 were manufactured according to the same manufacturing process as Example 1.

Preparation of Polyimide Mixture

The polyimide mixture of Example 2 was prepared according to a similar preparation process to Example 1, and the difference thereof is mainly: the amount of the amino-containing silica particle, wherein in the polyimide mixture of Example 2, the amount of the amino-containing silica particle is 0.72 g, and based on the total weight of the polyimide of Example 2, the content of the amino-containing silica particle is 6 wt %.

Preparation of Gas Separation Membrane

The gas separation membrane of Example 2 was prepared according to a similar preparation process to Example 1, and the difference thereof is mainly that: the polyimide mixture of Example 2 was used. Moreover, the thickness of the gas separation membrane of Example 2 is about 50 microns.

Example 3

Preparation of Polyimide and Amino-Containing Silica Particle

The polyimide and amino-containing silica particle of example 3 were manufactured according to the same manufacturing process as example 1.

Preparation of Polyimide Mixture

The polyimide mixture of Example 3 was prepared according to a similar preparation process to Example 1, and the difference thereof is mainly: the amount of the amino-containing silica particle, wherein in the polyimide mixture of Example 3, the amount of the amino-containing silica particle is 1.08 g, and based on the total weight of the polyimide of Example 3, the content of the amino-containing silica particle is 9 wt %.

Preparation of Gas Separation Membrane

The gas separation membrane of Example 3 was prepared according to a similar preparation process to Example 1, and the difference thereof is mainly that: the polyimide mixture of Example 3 was used. Moreover, the thickness of the gas separation membrane of Example 3 is about 70 microns.

Example 4

Preparation of Polyimide and Amino-Containing Silica Particle

The polyimide and amino-containing silica particle of Example 4 were manufactured according to the same manufacturing process as Example 1.
Preparation of Polyimide Mixture The polyimide mixture of Example 4 was prepared according to a similar preparation process to Example 1, and the difference thereof is mainly: the amount of the amino-containing silica particle, wherein in the polyimide mixture of Example 4, the amount of the amino-containing silica particle is 1.44 g, and based on the total weight of the polyimide of Example 4, the content of the amino-containing silica particle is 12 wt %.
Preparation of Gas Separation Membrane The gas separation membrane of Example 4 was prepared according to a similar preparation process to Example 1, and the difference thereof is mainly that: the polyimide mixture of Example 4 was used. Moreover, the thickness of the gas separation membrane of Example 4 is about 80 microns.

Example 5

Preparation of Polyimide and Amino-Containing Silica Particle

The polyimide and amino-containing silica particle of Example 5 were manufactured according to the same manufacturing process as Example 1.
Preparation of Polyimide Mixture The polyimide mixture of Example 5 was prepared according to a similar preparation process to Example 1, and the difference thereof is mainly: the amount of the amino-containing silica particle, wherein in the polyimide mixture of Example 5, the amount of the amino-containing silica particle is 2.4 g, and based on the total weight of the polyimide of Example 5, the content of the amino-containing silica particle is 20 wt %.
Preparation of Gas Separation Membrane The gas separation membrane of Example 5 was prepared according to a similar preparation process to Example 1, and the difference thereof is mainly that: the polyimide mixture of Example 5 was used. Moreover, the thickness of the gas separation membrane of Example 5 is about 90 microns.

Example 6

Preparation of Polyimide and Amino-Containing Silica Particle

The polyimide and amino-containing silica particle of Example 6 were manufactured according to the same manufacturing process as Example 1.
Preparation of Polyimide Mixture The polyimide mixture of Example 6 was prepared according to a similar preparation process to Example 1, and the difference thereof is mainly: the amount of the amino-containing silica particle, wherein in the polyimide mixture of Example 6, the amount of the amino-containing silica particle is 3.6 g, and based on the total weight of the polyimide of Example 6, the content of the amino-containing silica particle is 30 wt %.
Preparation of Gas Separation Membrane The gas separation membrane of Example 6 was prepared according to a similar preparation process to Example 1, and the difference thereof is mainly that: the polyimide mixture of Example 6 was used. Moreover, the thickness of the gas separation membrane of Example 6 is about 95 microns.

Example 7

Preparation of Polyimide

The polyimide of Example 7 was prepared according to a similar preparation process to Example 1, and the difference thereof is mainly that: in Example 7, 4,4'-(hexafluoroisopropylidene)diphthalic anhydride was used as a dianhydride monomer, and 2,2-dimethyl diaminobiphenyl was used as a diamine monomer. Specifically, the polyimide of Example 7 is represented by formula 1-2 above.
Preparation of Amino-Containing Silica Particle The amino-containing silica particle of Example 7 was manufactured according to the same manufacturing process as Example 1.
Preparation of Polyimide Mixture The polyimide mixture of Example 7 was prepared according to a similar preparation process to Example 1, and the differences thereof are mainly: the amount of the amino-containing silica particle, and the polyimide of Example 7 was used as the polyimide, wherein in the polyimide mixture of Example 7, the amount of the amino-containing silica particle is 2.4 g, and based on the total weight of the polyimide of Example 7, the content of the amino-containing silica particle is 20 wt %.
Preparation of Gas Separation Membrane The gas separation membrane of Example 7 was prepared according to a similar preparation process to Example 1, and the difference thereof is mainly that: the polyimide mixture of Example 7 was used. Moreover, the thickness of the gas separation membrane of Example 7 is about 100 microns.

Example 8

Preparation of Polyimide

The polyimide of Example 8 was prepared according to a similar preparation process to Example 1, and the difference thereof is mainly that: in Example 8, 2,2-bis(4-aminophenoxyphenyl)propane and 3,5-diaminobenzoic acid were used as the diamine monomers, wherein the mole ratio of 2,2-bis(4-aminophenoxyphenyl)propane and 3,5-diaminobenzoic acid and oxydiphthalic dianhydride is 1:1:2. Specifically, the polyimide of Example 8 is represented by formula 1-4 above.
Preparation of Amino-Containing Silica Particle The amino-containing silica particle of Example 8 was manufactured according to the same manufacturing process as Example 1.
Preparation of Polyimide Mixture The polyimide mixture of Example 8 was prepared according to a similar preparation process to Example 1, and the differences thereof are mainly: the amount of the amino-containing silica particle, and the polyimide of Example 8 was used as the polyimide, wherein in the polyimide mixture of Example 8, the amount of the amino-containing silica particle is 2.4 g, and based on the total weight of the polyimide of Example 8, the content of the amino-containing silica particle is 20 wt %.

Preparation of Gas Separation Membrane

The gas separation membrane of Example 8 was prepared according to a similar preparation process to Example 1, and the difference thereof is mainly that: the polyimide mixture of Example 8 was used. Moreover, the thickness of the gas separation membrane of Example 8 is about 100 microns.

Example 9

Preparation of Polyimide

The polyimide of Example 9 was prepared according to a similar preparation process to Example 1, and the difference thereof is mainly that: in Example 9, 9,9-bis(4-aminophenyl)fluorene was used as the diamine monomer. Specifically, the polyimide of Example 9 is represented by formula 1-3 above.

Preparation of Amino-Containing Silica Particle

The amino-containing silica particle of Example 9 was manufactured according to the same manufacturing process as Example 1.

Preparation of Polyimide Mixture

The polyimide mixture of Example 9 was prepared according to a similar preparation process to Example 1, and the differences thereof are mainly: the amount of the amino-containing silica particle, and the polyimide of Example 9 was used as the polyimide, wherein in the polyimide mixture of Example 9, the amount of the amino-containing silica particle is 2.4 g, and based on the total weight of the polyimide of Example 9, the content of the amino-containing silica particle is 20 wt %.

Preparation of Gas Separation Membrane

The gas separation membrane of Example 9 was prepared according to a similar preparation process to Example 1, and the difference thereof is mainly that: the polyimide mixture of Example 9 was used. Moreover, the thickness of the gas separation membrane of Example 9 is about 60 microns.

Comparative Example 1

Preparation of Polyimide

The polyimide of Comparative Example 1 was manufactured according to the same manufacturing process as Example 1.

Preparation of Gas Separation Membrane

First, the polyimide of Comparative Example 1 was made into a polyimide solution having a solid content of 12 wt % using 88 ml of a THF solvent. Next, the polyimide solution was coated on a glass substrate using a 500-micron coating scraper. Next, after the solution membrane on the glass substrate was cured by volatilizing the solvent, the solution membrane was peeled off from the glass substrate. Next, the membrane peeled from the glass substrate was placed in a vacuum oven at 100° C. to dry for 48 hours to remove residual solvent and obtain the gas separation membrane of Comparative Example 1, wherein the thickness of the gas separation membrane is about 45 microns.

Comparative Example 2

Preparation of Gas Separation Membrane

The gas separation membrane of Comparative Example 2 was prepared according to a similar preparation process to Comparative Example 1, and the difference thereof is mainly that: the polyimide used was a commercial polyimide codenamed Matrimid, and the structure thereof is as shown below. Moreover, the thickness of the gas separation membrane of Comparative Example 2 is about 100 microns.

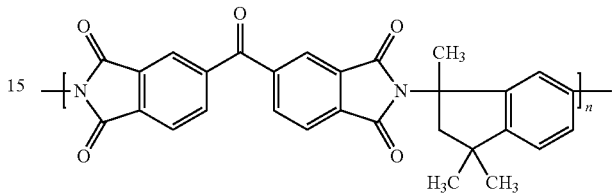

Comparative Example 3

Preparation of Amino-Containing Silica Particle

The amino-containing silica particle of Comparative Example 3 was manufactured according to the same manufacturing process as Example 1.

Preparation of Gas Separation Membrane

At room temperature, after 2.4 g of the amino-containing silica particle of Comparative Example 3 was placed in 88 ml of an NMP solvent, ultrasonic oscillation was performed for 2 hours to make the particle size distribution thereof more even and to evenly spread the amino-containing silica particle in the NMP solvent. Next, a commercial polyimide codenamed Matrimid was dissolved in a mixed solution in which the amino-containing silica particle of Comparative Example 3 was dispersed to prepare the polyimide mixed solution of Comparative Example 3 having a solid content of 12 wt %. Next, the polyimide mixed solution was coated on a glass substrate using a 500-micron coating scraper. Next, after the polyimide mixed solution on the glass substrate was cured by volatilizing the solvent, the solution membrane was peeled off from the glass substrate. Next, the membrane was placed in a vacuum oven at 100° C. to dry for 48 hours to remove residual solvent and obtain the gas separation membrane of Comparative Example 3, wherein the thickness of the gas separation membrane is about 100 microns.

Comparative Example 4

Preparation of Gas Separation Membrane

The gas separation membrane of Comparative Example 4 was prepared according to a similar preparation process to Comparative Example 3, and the difference thereof is mainly that: the polyimide used was a commercial polyimide codenamed P84, and the structure thereof is as shown below. Moreover, the thickness of the gas separation membrane of Comparative Example 4 is about 125 microns.

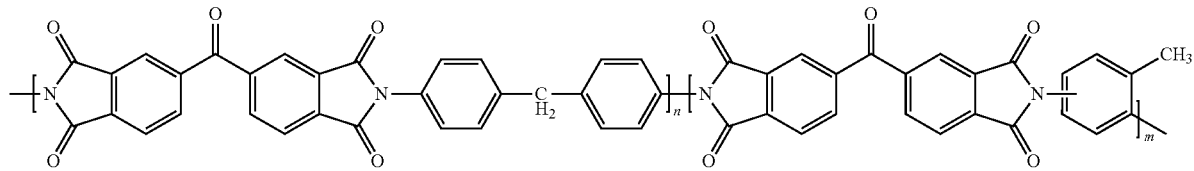

Comparative Example 5

Preparation of Gas Separation Membrane

The gas separation membrane of Comparative Example 5 was prepared according to a similar preparation process to Comparative Example 3, and the difference thereof is mainly that: the polyimide used was a commercial polyimide code-named PEI, and the structure thereof is as shown below. Moreover, the thickness of the gas separation membrane of comparative Example 5 is about 40 microns.

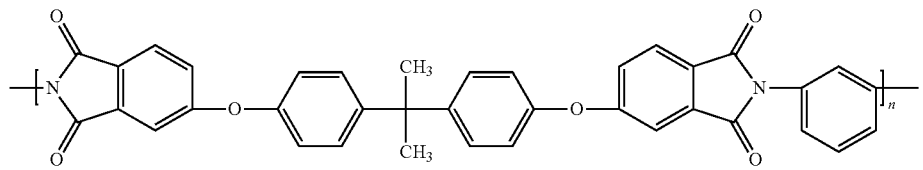

Next, gas permeation tests of carbon dioxide ($CO_2$), nitrogen ($N_2$), and oxygen ($O_2$) were respectively performed on the gas separation membranes of Examples 1 to 6 and Comparative Examples 1 to 2, and gas permeation tests of carbon dioxide ($CO_2$) and nitrogen ($N_2$) were respectively performed on the gas separation membranes of Examples 7 to 9 and Comparative Examples 3 to 4, and the gas separation behavior was evaluated by the test results. Descriptions of the tests above are provided below, and the test results and evaluation results of gas separation behavior are shown in Table 1.

<Gas Permeation Test>

First, the gas separation membranes of Examples 1 to 9 and Comparative Examples 1 to 5 were respectively cut into a circular membrane material having a diameter of 5 cm. Next, gas permeation tests of different gases were respectively performed on each of the membrane materials using a pneumatic gas permeability tester (model: Yanaco GTR-10), and gas permeability was calculated by the following formula P:

$$P = \frac{q \times k \times l}{(p_1 - p_2) \times A \times t},  \quad \text{formula P}$$

wherein P: gas permeability (barrer), q: gas volume ($cm^3$) passing through gas separation membrane, k: correction factor, l: thickness (cm) of gas separation membrane, A: effective area ($cm^2$) of gas separation membrane, t: testing time (sec), and $p_1$ and $p_2$: gas partial pressures (cmHg) above and below gas separation membrane; and the selection coefficient was calculated with formula S below:

$$\alpha_{A/B} = P_A/P_B \quad \text{formula S}$$

wherein $\alpha_{A/B}$: selection coefficient of gas A and gas B, $P_A$: gas permeability of gas A, $P_B$: gas permeability of gas B.

TABLE 1

| | Gas type | Gas permeability (barrer) | Selection coefficient $CO_2/N_2$ | $O_2/N_2$ |
|---|---|---|---|---|
| Example 1 | $CO_2$ | 53.49 ± 2.93 | 28.10 | 4.44 |
| | $N_2$ | 1.90 ± 0.07 | | |
| | $O_2$ | 8.45 ± 0.38 | | |

TABLE 1-continued

| | Gas type | Gas permeability (barrer) | Selection coefficient $CO_2/N_2$ | $O_2/N_2$ |
|---|---|---|---|---|
| Example 2 | $CO_2$ | 83.56 ± 3.21 | 29.24 | 4.51 |
| | $N_2$ | 2.86 ± 0.11 | | |
| | $O_2$ | 12.87 ± 0.53 | | |

TABLE 1-continued

| | Gas type | Gas permeability (barrer) | Selection coefficient $CO_2/N_2$ | $O_2/N_2$ |
|---|---|---|---|---|
| Example 3 | $CO_2$ | 130.11 ± 4.63 | 28.33 | 4.60 |
| | $N_2$ | 4.59 ± 0.20 | | |
| | $O_2$ | 21.13 ± 0.79 | | |
| Example 4 | $CO_2$ | 161.53 ± 8.14 | 27.32 | 4.29 |
| | $N_2$ | 5.91 ± 0.33 | | |
| | $O_2$ | 25.37 ± 1.35 | | |
| Example 5 | $CO_2$ | 210.10 ± 33.25 | 30.84 | 4.34 |
| | $N_2$ | 6.81 ± 0.65 | | |
| | $O_2$ | 29.53 ± 3.11 | | |
| Example 6 | $CO_2$ | 203.75 ± 22.47 | 23.80 | 4.18 |
| | $N_2$ | 8.56 ± 0.87 | | |
| | $O_2$ | 35.80 ± 4.13 | | |
| Example 7 | $CO_2$ | 70.31 | 27.79 | — |
| | $N_2$ | 2.53 | | |
| Example 8 | $CO_2$ | 2.39 | 34.14 | — |
| | $N_2$ | 0.07 | | |
| Example 9 | $CO_2$ | 8.06 | 42.42 | — |
| | $N_2$ | 0.19 | | |
| Comparative example 1 | $CO_2$ | 66.94 ± 1.89 | 27.81 | 4.35 |
| | $N_2$ | 2.41 ± 0.13 | | |
| | $O_2$ | 10.47 ± 0.45 | | |
| Comparative example 2 | $CO_2$ | 12.58 ± 0.16 | 38.80 | 5.41 |
| | $N_2$ | 0.32 ± 0.03 | | |
| | $O_2$ | 1.75 ± 0.06 | | |
| Comparative example 3 | $CO_2$ | 78.88 | 1.84 | — |
| | $N_2$ | 42.84 | | |
| Comparative example 4 | $CO_2$ | 91.12 | 1.05 | — |
| | $N_2$ | 87.00 | | |
| Comparative example 5 | $CO_2$ | 2.87 | 29.51 | — |
| | $N_2$ | 0.1 | | |

It can be known from Table 1 that, the gas separation membranes of Examples 1 to 7 all have good gas permeability. The results show that, using a membrane formed by the polyimide mixture containing the polyimide including the repeating unit represented by formula 1 and the amino-containing silica particle mixed with the polyimide and obtained by the reaction of the alkoxysilane shown in formula 2 and the alkoxysilane shown in formula 3 in the presence of a catalyst as the gas separation membrane can achieve good gas permeability.

It can also be known from Table 1 that, an increase in the content of the amino-containing silica particle in the polyimide mixture results in a significant increase in the gas permeability of the gas separation membrane.

Moreover, it can be known from Table 1 that, for $CO_2$ and $N_2$, the gas separation membranes of Examples 1 to 5 not only have good gas permeability, but also maintain good gas selectivity; and for $O_2$ and $N_2$, the gas separation membranes of Examples 1 to 6 not only have good gas permeability, but also maintain good gas selectivity. The results show that, using a membrane formed by the polyimide mixture containing the polyimide including the repeating unit represented by formula 1 and the amino-containing silica particle mixed with the polyimide and obtained by the reaction of the alkoxysilane shown in formula 2 and the alkoxysilane shown in formula 3 in the presence of a catalyst as the gas separation membrane can achieve both effects of good gas permeability and gas selectivity; and based on the types of gases separated, by adjusting the content of the amino-containing silica particle mixed with the polyimide and obtained by the reaction of the alkoxysilane shown in formula 2 and the alkoxysilane shown in formula 3 in the presence of a catalyst within a specific content range, both effects of good gas permeability and gas selectivity of the gas separation membrane can be achieved.

Moreover, it can be known from Table 1 that, for $CO_2$ and $N_2$, the gas separation membrane of Example 7 not only has good gas selectivity, but also maintains good gas selectivity. The results show that, using a membrane formed by the polyimide mixture containing the polyimide including the repeating unit represented by formula 1 and the amino-containing silica particle mixed with the polyimide and obtained by the reaction of the alkoxysilane shown in formula 2 and the alkoxysilane shown in formula 3 in the presence of a catalyst as the gas separation membrane can achieve both effects of good gas permeability and gas selectivity.

Moreover, it can be known from Table 1 that, for $CO_2$ and $N_2$, the gas separation membranes of Examples 8 to 9 have excellent gas selectivity. The results show that, a membrane formed by the polyimide mixture containing the polyimide including the repeating unit represented by formula 1 and the amino-containing silica particle mixed with the polyimide and obtained by the reaction of the alkoxysilane shown in formula 2 and the alkoxysilane shown in formula 3 in the presence of a catalyst can be used as a gas separation membrane.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A polyimide mixture, comprising:
a polyimide represented by formula 1-4 below:

formula 1-4

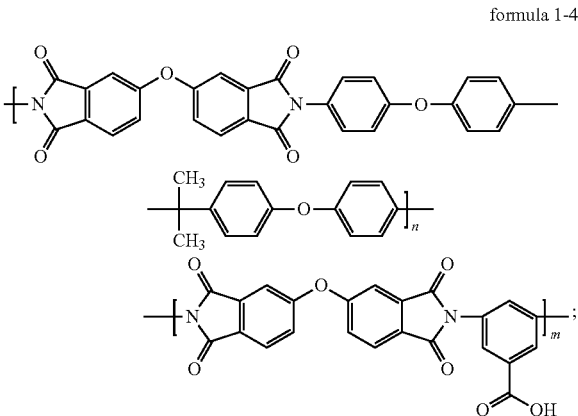

and
an amino-containing silica particle mixed with the polyimide and obtained by a hydrolysis condensation reaction of an alkoxysilane shown in formula 2 and an alkoxysilane shown in formula 3 in the presence of a catalyst:

$$Si(OR^1)_4 \qquad \text{formula 2,}$$

$$(NH_2-Y)_m-Si(OR^2)_{4-m} \qquad \text{formula 3,}$$

wherein in formula 2, $R^1$ is a $C_1$-$C_{10}$ alkyl group; and in formula 3, Y is a $C_1$-$C_{10}$ alkyl group or a $C_2$-$C_{10}$ alkenyl group, $R^2$ is a $C_1$-$C_{10}$ alkyl group, and m is an integer of 1 to 3.

2. The polyimide mixture of claim 1, wherein based on a total weight of the polyimide, a content of the amino-containing silica particle is 3 wt % to 30 wt %.

3. The polyimide mixture of claim 1, wherein based on a total weight of the polyimide, a content of the amino-containing silica particle is 3 wt % to 20 wt %.

4. The polyimide mixture of claim 1, wherein an equivalent number of an amino in the amino-containing silica particle is 5 mmole/g to 10 mmole/g.

5. The polyimide mixture of claim 1, wherein the alkoxysilane shown in formula 2 comprises tetramethoxysilane, tetraethoxysilane, tetrapropoxysilane, or tetrabutoxysilane, and the alkoxysilane shown in formula 3 comprises 3-aminopropyltrimethoxysilane, 3-aminopropyltriethoxysilane, 3-aminoethylaminopropyltrimethoxysilane, or 3-aminoethylaminopropyltriethoxysilane.

6. The polyimide mixture of claim 1, wherein the alkoxysilane shown in formula 2 comprises tetraethoxysilane, and the alkoxysilane shown in formula 3 comprises 3-aminopropyltriethoxysilane.

7. The polyimide mixture of claim 1, wherein an intrinsic viscosity of the polyimide is 0.5 dL/g to 1.5 dL/g.

8. A gas separation membrane made from the polyimide mixture of claim 1.

* * * * *